Dec. 8, 1959   J. D. BOURKE ET AL   2,915,979
GRIT AND CORROSION SEAL FOR UNIVERSAL JOINTS
IN PUMPS HAVING ECCENTRICALLY MOVING ROTORS
Filed Nov. 23, 1956
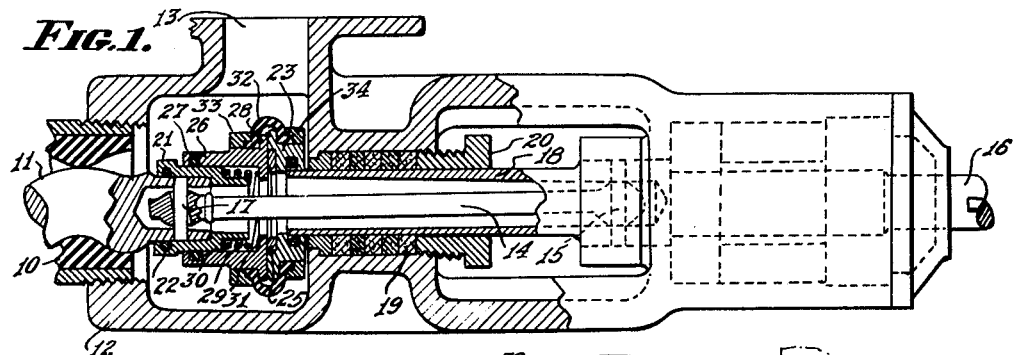
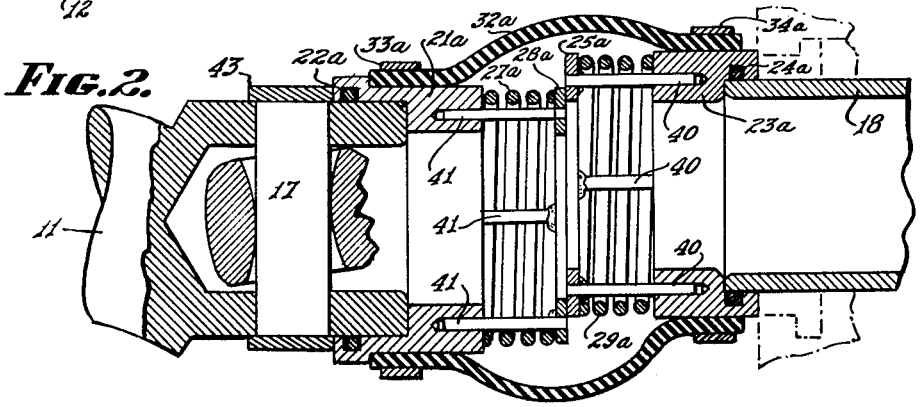
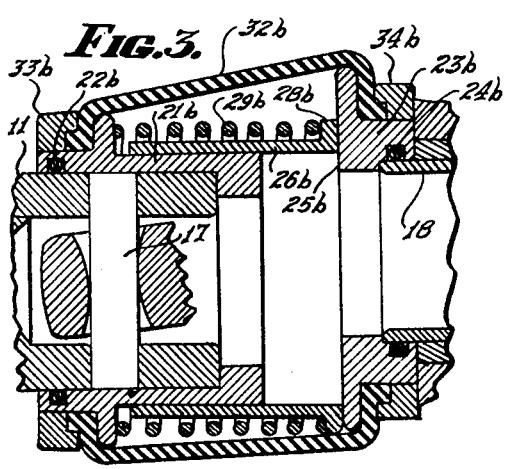
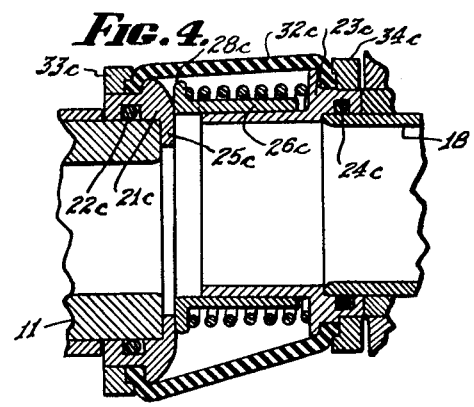
INVENTORS.
JOHN DAVID BOURKE
AND STRAWDER A. COMER,
BY
ATTORNEYS.

United States Patent Office 2,915,979
Patented Dec. 8, 1959

2,915,979

GRIT AND CORROSION SEAL FOR UNIVERSAL JOINTS IN PUMPS HAVING ECCENTRICALLY MOVING ROTORS

John David Bourke and Strawder A. Comer, Springfield, Ohio, assignors to Robbins & Myers, Inc., Springfield, Ohio, a corporation of Ohio Application November 23, 1956, Serial No. 624,086

7 Claims. (Cl. 103—117)

This invention relates to pumps of the progressing cavity type comprising a stator and a rotor which has an eccentric or orbital movement with respect to the stator. In such pumps, the rotors are driven by means of a connecting rod which is connected to the rotor at one end and to a drive shaft at the other end by means of universal joints. The universal joint between the connecting rod and rotor is generally within the pump casing. More particularly, this invention relates to sealing means for such universal joints to protect the same from grit where such pump is being used with highly abrasive liquids and to protect the same from corrosion where the pump is being used with corrosive liquids.

Pumps of the progressing cavity type have for many years been well known under the trademark Moyno, manufactured and sold by the assignee of the present application. These pumps have been used with great success in applications where it is necessary to work with highly abrasive and/or highly corrosive materials. With such materials, however, there is a deterioration on the universal joint either from corrosion or abrasion and it is, therefore, the principal object of the present invention to provide a seal which will effectively protect the universal joint while at the same time permitting the necessary orbital movement involved. It is the orbital movement and the fact that the universal joint is necessary to convert the axial rotation of a drive shaft to the orbital rotation of the rotor which makes the provision of such a seal complicated.

It is therefore a further object of the invention to provide a seal as outlined above which involves the use of a minimum number of parts and which will be relatively simple and trouble-free.

These and other objects of the invention which we shall point out in more detail hereinafter or which will be apparent from a reading of these specifications, we accomplish by that certain construction and arrangement of parts of which we shall now disclose several exemplary embodiments.

Reference is made to the drawings forming a part hereof and in which:

Figure 1 is a fragmentary cross-sectional view through the universal joint portion of a typical pump showing one embodiment of the seal.

Figures 2, 3 and 4 are similar views on an enlarged scale of modification.

The problem briefly is that we have a member rotating on its own axis and we have a second member to be rotated while moving in an orbital path. Rotation is transmitted from the member rotating on its own axis to the member rotating in the orbital path by means of a connecting rod which is drivingly secured to the respective members by means of universal joints. Briefly, in the practice of the invention, therefore, we provide a member which is in sealing engagement with the member rotating on its own axis and a second member which is in sealing engagement with the element which is rotating while moving in an orbital path. We provide further an element in telescoping relation with one of said members and the telescoping member is provided with a bearing surface normal to the axis of rotation cooperating with a similar bearing surface associated with the other member. The bearing surfaces are spring urged into engagement and a flexible impervious sleeve protects the two bearing surfaces.

Referring now in more detail to the drawings, it will be noted that the four embodiments shown differ considerably in detail but as will be clear from a reading of the entire specification a common principle prevails in all cases.

Referring first to Figure 1, the stator of the pump is indicated at 10 and the rotor at 11. A portion of the pump casing is shown at 12. One of the pump ports is indicated at 13. The connecting rod 14 is connected, as indicated in broken lines, at 15 to the pump drive shaft 16. At its inner end the connecting rod 14 is connected to the rotor 11 by means of the universal joint indicated generally at 17. By means of this construction, as the shaft 16 rotates on its own axis the connecting rod 14 will be rotated and will move in a conical path with the point 15 being at the apex and it will transmit rotation to the rotor 11 while the axis of the latter moves in a cylindrical path.

A sleeve member 18 surrounds the connecting rod 14 and is secured to the connecting rod and/or the drive shaft for rotation therewith. The sleeve 18 therefore rotates with the drive shaft 16 on its own axis.

The casing 12 has a shaft entrance 19 through which the sleeve 18 passes in sealing engagement. Sealing may be accomplished by means of a conventional packing gland 20. The sleeve 18 terminates within the casing 12.

The structure thus far described is common to all of the embodiments. In Figures 2, 3 and 4 the connecting rod has been omitted for clarity and in Figure 4 the universal joint 17 has been omitted.

The seal of Figure 1 comprises a member 21 which may have a press fit on the end of the rotor 11 and be sealed by means of an O-ring 22. A member 23 is similarly secured to the sleeve 18 and sealing is accomplished by an O-ring 24. In this particular embodiment, the member 23 is provided with an annular recess in which there is seated a wear insert 25 presenting a bearing surface normal to the axis of the rotor.

An element 26 is in telescoping arrangement with the member 21 and is annularly sealed thereagainst by means of an O-ring 27. The member 26 is provided with a bearing surface 28 adapted to cooperate with the bearing surface of the insert 25.

A compression spring 29 bears at one end against a shoulder 30 on the member 21 and at the other end against a shoulder 31 on the member 26, and the compression spring 29 urges the bearing surfaces against each other.

The cooperating bearing surfaces are covered by a flexible and impervious sleeve 32 which is clamped to the member 26 by means of a clamping ring 33 and to the member 23 by means of a clamping ring 34.

During operation of the pump, the member 23 will be rotating on its true axis. The member 26 will be rotating and moving in an orbit, but during such movement it will be bearing with its bearing surface 28 against the bearing insert 25 under the influence of the spring 29. Corrosive and abrasive deterioration of the cooperating bearing surfaces is effectively prevented by the flexible sleeve 32 which permits the orbital movement by virtue of its flexibility and protects the bearing surfaces by virtue of its imperviousness.

In the embodiment of Figure 2, we have again provided a member 21a secured to the rotor and sealed thereagainst by the O-ring 22a. We have also provided a member 23a secured to the sleeve 18 and sealed thereagainst by means of the O-ring 24a.

In this embodiment, however, the cooperating bearing surfaces are in the form of rings 28a and 25a having cooperating bearing surfaces and the ring 25a is in telescoping relation with the member 23a by means of the pins 40 secured to the ring 25a and slidable in holes in the member 23a. Similarly the ring 28a is in telescoping relation with the member 21a by virtue of the pins 41 secured to the ring 28a and slidable in holes in the member 21a. A spring 29a urges the ring 28a toward the right of the figure and a like spring 29aa urges the ring 25a toward the left of the figure. Again a flexible impervious sleeve 32a is clamped by means of a ring 33a to the member 21a and by a ring 34a to the member 23a.

As before, during operation of the pump the sleeve 18, the member 23a and the ring 25a rotate on the axis of the sleeve. The member 21a and its ring 28a rotate while moving in an orbital path. The bearing surfaces 25a and 28a are urged against each other and are in sliding contact. They are protected as before by the flexible sleeve which is clamped on either side of the bearing surfaces.

In the embodiment of Figure 3, another variant is shown. Here the member 21b is secured to the rotor 11 and sealed thereagainst by the O-ring 22b. The member 23b is secured to the sleeve 18 and sealed thereagainst by the O-ring 24b. In this instance the member 23b provides the bearing surface 25b which cooperates with a bearing surface 28b formed on the sleeve 26b which is in telescoping engagement with the member 21b. The compression spring 29b bears against a shoulder on the member 21b and against a flange on the member 26b to urge the bearing surfaces 28b and 25b into engagement. A flexible sleeve 32b is clamped to the member 21b by means of the clamping ring 33b and to the member 23b by means of the clamping ring 34b.

In the embodiment of Figure 4, we again provide a member 21c secured to the rotor 11 and having the O-ring 22c. Again, we provide the member 23c secured to the sleeve 18 and having the O-ring 24c. In this embodiment, the sleeve member 26c is in telescoping engagement with the member 23c and has the bearing surface 28c engaging a bearing surface 25c formed on the member 21c. The flexible sleeve 32c as before is clamped to the member 21c by means of the clamping ring 33c and to the member 23c by the clamping ring 34c. It will be clear that the operation of the seal is the same in all of the embodiments and that they differ only in details of execution. While in Figure 1 the member 21 covers the holes in which the pin of the universal joint 17 is received, and in Figure 3 the member 21b similarly effectively covers said holes and in both instances the O-ring is beyond the holes in Figures 2 and 4, there is a further modification in that a ring 43 is provided to seal the pin holes.

It will be understood that numerous modifications may be made without departing from the spirit of the invention. We, therefore, do not intend to limit ourselves except as set forth in the claims which follow.

Having now fully described our invention, what we claim as new and desire to secure by Letters Patent is:

1. In a progressing cavity gear pump having a casing, and having a rotor and stator within said casing, said rotor having eccentric motion with respect to said stator, said casing having a shaft entrance, and a connecting rod secured to said rotor by a universal joint within said casing and passing freely through said shaft entrance; a sleeve surrounding said connecting rod and secured to the outer end thereof for rotation therewith, and passing through said shaft entrance and terminating within said casing, and in rotary sealing engagement with said shaft entrance, a first member in sealing engagement with said sleeve within said casing, a second member in sealing engagement with said rotor, an element in telescoping relation with one of said first and second members and having a bearing surface in a plane normal to the axis of said rotor, a similar bearing surface associated with the other of said first and second members and adapted to coact with said first mentioned bearing surface, and spring means bearing against said element and said one of said first and second members to urge said bearing surfaces into engagement with each other, and a flexible, impervious sleeve, annularly clamped to one of said members on each side of said engaging bearing surfaces.

2. In a progressing cavity gear pump having a casing, and having a rotor and stator within said casing, said rotor having eccentric motion with respect to said stator, said casing having a shaft entrance, and a connecting rod secured to said rotor by a universal joint within said casing and passing freely through said shaft entrance; a sleeve surrounding said connecting rod and secured to the outer end thereof for rotation therewith, and passing through said shaft entrance and terminating within said casing, and in rotary sealing engagement with said shaft entrance, a first member in sealing engagement with said sleeve within said casing, a second member in sealing engagement with said rotor, a sleeve member in telescoping relation with one of said first and second members and having a bearing surface in a plane normal to the axis of said rotor, the other of said first and second members having a similar bearing surface adapted to coact with said first mentioned bearing surface, and spring means bearing against said sleeve member and said one of said first and second members to urge said bearing surfaces into engagement with each other, and a flexible, impervious sleeve, annularly clamped to one of said members on each side of said engaging bearing surfaces.

3. A structure according to claim 1, wherein said bearing surfaces comprise a pair of rings each having a plurality of pins normal to the respective bearing surfaces, the pins of one ring being telescopingly engaged in holes in said first member and the pins of the other bearing ring being telescopingly engaged in holes in said second member and a compression spring between each ring and the member with which the respective ring is in telescoping engagement.

4. A structure according to claim 2, wherein one of the engaging bearing surfaces is formed on said first member and the other of said bearing surfaces is formed on said sleeve member, said sleeve being in telescoping relation with said second member.

5. A structure according to claim 2, wherein one of said bearing surfaces is formed on said second member and said sleeve member is in telescoping relationship with said first member.

6. A structure according to claim 2, wherein said flexible impervious sleeve is clamped respectively to said first and second members.

7. A structure according to claim 2, wherein said flexible impervious sleeve is clamped respectively to said first member and to said telescoping sleeve member.

References Cited in the file of this patent

UNITED STATES PATENTS

| | | |
|---|---|---|
| 2,065,834 | Swennes | Dec. 29, 1936 |
| 2,545,604 | Byram | Mar. 20, 1951 |
| 2,636,444 | Salgues | Apr. 28, 1953 |
| 2,686,618 | Mateer | Aug. 17, 1954 |
| 2,693,764 | Cornelius | Nov. 9, 1954 |
| 2,695,565 | Seinfeld | Nov. 30, 1954 |
| 2,695,694 | Seinfeld | Nov. 30, 1954 |
| 2,733,854 | Chang | Feb. 7, 1956 |
| 2,759,427 | Holstein | Aug. 21, 1956 |
| 2,773,453 | Gemeinhardt | Dec. 11, 1956 |